July 3, 1934.  E. V. J. TOWER  1,965,326

FRICTION CLUTCH

Original Filed March 26, 1929

INVENTOR
Elmer V. J. Tower
BY
Pennie, Davis, Marvin & Edmonds
ATTORNEYS

Patented July 3, 1934

1,965,326

UNITED STATES PATENT OFFICE 1,965,326

FRICTION CLUTCH

Elmer V. J. Tower, North Syracuse, N. Y., assignor, by mesne assignments, to Automotive Patents Corporation, New York, N. Y., a corporation of Delaware Original application March 26, 1929, Serial No. 349,933. Divided and this application April 28, 1931, Serial No. 533,392

12 Claims. (Cl. 192—107)

This invention relates to clutches of the type used in motor cars and is concerned more particularly with a transmitting element or disc for use in clutches either of the single or twin disc types. In such clutches, for example, a single disc clutch, there is a driver member, which may conveniently be the fly wheel of the motor, and a driven member, usually a disc, splined or otherwise connected to a shaft and forced into engagement with a face of the fly wheel by the clutch presser plate when the clutch is effective to transmit power. The present invention is concerned specifically with a novel transmitting disc which is flexible so as to allow for misalignment of certain parts of the clutch and which also includes a novel friction element.

In the ordinary single disc clutch, the disc comprises a supporting member and a mat of friction material mounted thereon. The supporting member includes a hub and a disc element which is frequently a single disc of sheet metal mounted on the hub. The friction mat is then secured to the metal disc at its periphery and on both faces thereof by rivets passing through the two rings of friction material and through the sheet metal disc. This construction produces a transmitting disc which is quite rigid and inflexible and if the presser plate and the surface on the driver member become slightly out of alignment, the friction material does not make a good contact and as a result the clutch may slip or the friction material may be subjected to undue wear over certain areas.

The present invention is accordingly directed to the provision of a clutch disc which overcomes the difficulties mentioned and which is flexible so that it may conform closely to irregularities in the machined surfaces of the driver member and clutch presser plate with which it contacts in operation. As a further feature of the invention, there is provided a friction mat secured to a supporting member without the use of rivets or other mechanical means which directly engage the supporting member, with a consequence that the friction material serves as a heat-insulating means and prevents the transmission of heat from the driver member to the driven shaft.

Specifically the new transmitting element includes a plurality of spokes which extend outwardly from a central hub assembly and at their free ends engage a ring or mat of friction material. These spokes are of relatively large size at the hub ends but of uniformly reduced size where they engage the mat. The spokes accordingly have uniform flexibility and may be bent out of their plane of normal rotation.

The friction material may in one form include a ring of material woven on a curve and having pockets formed therein between the faces of the ring to receive the ends of the individual spokes. Preferably the spokes are bifurcated at their ends and the friction material is woven in a number of plies with pairs of pockets between the plies opening at the inner edge of the ring and receiving the divided ends of the spokes. The abutting ends of the ring each have a pocket adjacent thereto so that these pockets may receive the divided ends of a single spoke. With this arrangement, the friction material may be securely mounted in place on the spoke structure without the necessity of mechanical connections such as rivets through the spokes. The friction material thus insulates and protects the spokes and since the spokes and friction material are flexible, the friction material may be slightly distorted so that it will conform freely to irregularities in the working surfaces of the clutch and flywheel and make good contact even though the parts on which surfaces are provided are out of alignment or the surfaces not properly machined.

In some instances in which it is desired to employ a friction mat of the molded type which is usually quite rigid, the desired flexibility can be obtained by subdividing the molded mat into a plurality of arcuate segments, each segment being mounted on the double forked end of a spoke and the segments having portions which overlap between the spokes so that, although the segments are independent and disconnected, they provide substantially continuous working faces. These segments may be secured to the spoke ends without extraneous mechanical means and act as heat insulators for the spokes and, in addition, by reason of the independence of one segment from the next, the mat does not interfere with the uniform flexing of the spokes as may be required under certain working conditions.

For a detailed illustration of a preferred embodiment of this device, reference may be had to the drawing forming a part of this application.

Figure 1:
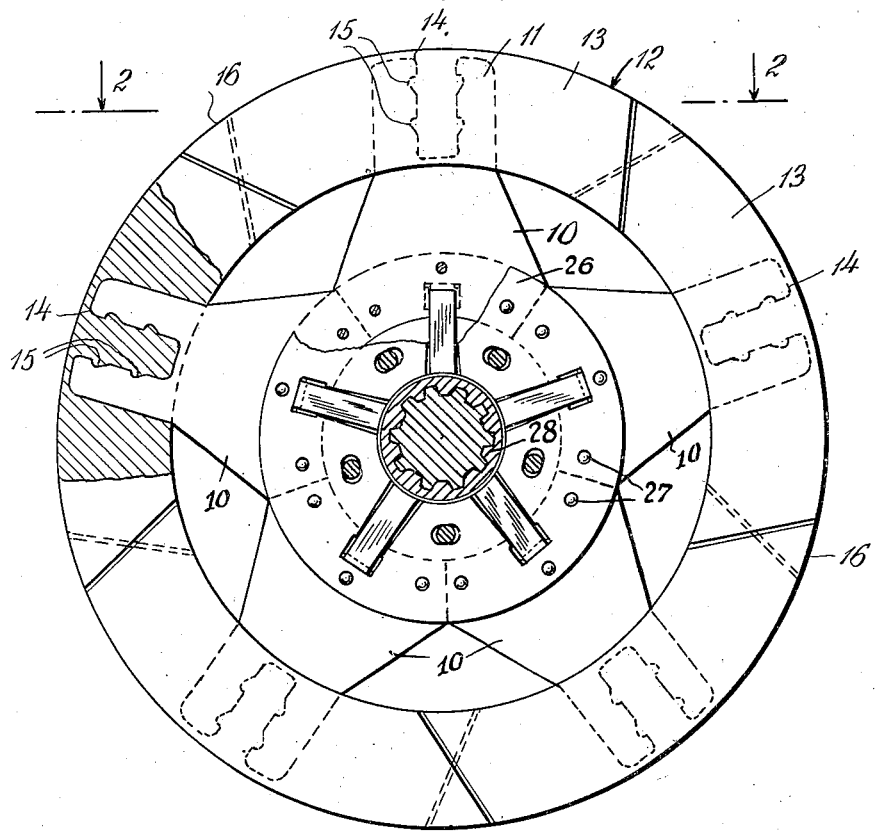
Fig. 1 is a plan view of the disc partly in section.

In the drawing, spokes 10, each having a bifurcated end forming two legs 11, carry a ring 12 of friction material. The legs 11 of the bifurcated ends of the spokes are embedded in the ring as indicated at 14 and teeth or serrations 15 formed along the inner edges of the legs 11 serve as a means for anchoring the friction material in place.

The spokes 10 are mounted between two rings 26, one on each side of the spokes and held in place by rivets 27 passing through the ring and spokes. The rings are in turn mounted upon a hub 28 as described in my application Serial No. 349,933 filed March 26, 1929 of which this application is a division, and hence this part of the construction is not described in detail in this application.

Figure 2:
Fig. 2 is a sectional view of Fig. 1 taken from above on the line 2—2 of Fig. 1.

In the construction shown in Fig. 1, the ring 12 is made of friction material moulded on the ends of the spokes. The complete ring is not in a single piece but is cut in the form of a series of arcuate segments 13, one on each spoke. The segments have overlapping portions 16, as indicated in Fig. 2, and these portions are so formed as to provide a pair of joints intersecting each other and lying between adjacent spokes. The ends of the segments are not connected together and thus the ring has substantial flexibility so that it conforms to inequalities in the fly wheel and clutch presser plate or other clamping means and compensates for imperfections arising from manufacture or installation.

In producing the disc, two continuous rings of friction material are placed in contact with the opposite faces of the spokes at their ends and a suitable lubricant material is placed between the faces of the rings at the places where the rings are later to be cut to form segments. The rings are then processed in the usual way, the lubricant preventing the rings from sticking together at the desired points. Thereafter the rings are cut to form segments having overlapping ends and the ends are free of one another so that the segments may provide the desired flexibility when occasion arises.

Figure 3:
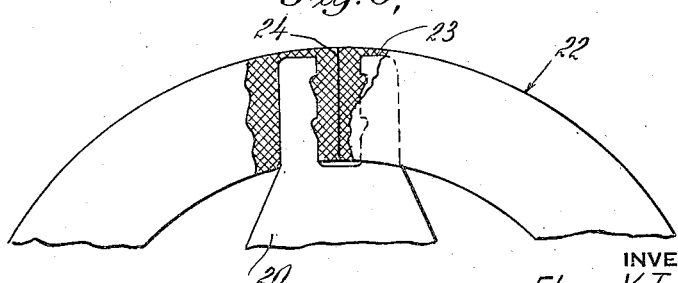
Fig. 3 is a view partly in section of a modified form of the device.

In the construction illustrated in Fig. 3, the friction ring is a length of fabric woven on a curve. The fabric is of multiple ply and has pockets 23 woven between the plies and arranged in pairs to receive the bifurcated ends of the spokes 20. In mounting the woven friction ring on the spokes, a suitable length of fabric is cut and the forked ends of one spoke are inserted into the pockets one at each end of the ring. The forked ends of the individual spokes are then inserted in the remaining pairs of pockets and the hub ends of the spokes are secured together in a plane, for instance, between pairs of flat washers. The assembly is then attached to a hub and the friction material processed in a suitable manner. The ring is under tension when it is mounted in place and the processing is carried on after the disc assembly has been completed so that the fabric is held firmly in position and does not wrinkle, loosen, or bulge. By using the woven ring and mounting it on the bifurcated spoke ends in the manner described, no rivets or other fastening means are required for holding the ring in position. The pockets at the ends of the ring are entered by the end members of a single spoke so that the free ends of the ring beyond these pockets are quite short and are held in place in the space between the ends of the single spoke and thus do not become displaced in use.

The structure as here disclosed in Fig. 3 may be used with the friction ring made of a single piece of material and divided only at the one point 24 as above described, or it may be made of several pieces, with the ends of adjacent pieces mounted on the end members of a single spoke.

With either construction described the accommodation of the friction mat to the operating surfaces is permitted by the flexibility of the spokes and the manner in which the friction material is mounted thereon. Woven material is somewhat flexible in itself and tends to conform to irregularities in the operating surfaces. The molded material, which is much more rigid, is flexible in my construction by reason of the fact that the ring is made up of a plurality of independent and disconnected segments.

This application is a division of my copending application, Serial No. 349,933, filed March 26, 1929.

I claim:

1. In a friction clutch, a transmitting member comprising a ring of friction material, a support, and connections between the ring and support including a plurality of independent spokes terminating in bifurcated ends, said ends being enclosed in said material.

2. In a friction clutch, a transmitting member comprising a substantially continuous friction ring, said ring having a plurality of pockets arranged in pairs around the ring, and a support having a plurality of spokes, each terminating in a pair of members enclosed one in each pocket of a pair.

3. In a friction clutch, a transmitting member comprising a support made up of a plurality of spokes each terminating in a pair of spaced end members, and a length of friction material woven on a curve and in multi-ply, said material having pairs of pockets parallel to its faces between its plies and spaced along said length, each end member being received in a pocket, and the end members on one spoke entering pockets adjacent the ends of said length of material whereby the spoke straddles the joint between adjacent ends of the friction material.

4. In a friction clutch, the combination of a circular strip of friction material having a pocket in each end thereof, and a support therefor including a pair of adjacent projections, said strip being adapted to be mounted on said support and one of said projections inserted in each of said pockets, whereby the ends of the strip are jointed to form a continuous ring.

5. In a friction clutch, a transmitting member comprising a friction ring divided into a plurality of separate segments, supporting means for each segment and overlapping portions on adjacent segments, said portions overlapping in a direction which will not permit relative movement of the segments in a direction perpendicular to the working face and provide a substantially continuous working face.

6. In a friction clutch, a transmitting member comprising a plurality of segments of friction material, all lying with their working faces substantially in one plane, overlapping joints connecting adjacent edges of the successive segments, and a support for each segment whereby the segments form a complete ring.

7. In a friction clutch, a transmitting member comprising a plurality of segments of friction material, all lying with their working faces substantially in one plane, overlapping joints connecting adjacent edges of the successive segments, and spokes supporting the segments whereby the segments form a complete ring.

8. In a friction clutch, a transmitting member comprising a friction ring divided into a plurality of separate segments, means to support each of said segments and means to prevent relative movement of the ends of said segments in a direction perpendicular to the working faces thereof.

9. In a friction clutch, a transmitting member comprising a friction ring divided into a plurality of separate segments, means comprising spokes to support said segments and means to prevent relative movement of the ends of said segments in a direction perpendicular to the working faces thereof.

10. In a friction clutch, a transmitting member comprising a friction ring so constructed that at a point in the ring two ends of the material forming the ring lie abutting, spokes having bifurcated ends supporting said ring, the end of one of said spokes straddling the said ends of friction material and holding the ring together.

11. In a friction clutch, a transmitting member comprising a support made up of a plurality of spokes each terminating in a pair of spaced end members having serrated edges, and a length of friction material woven on a curve and in multi-ply, said material having pairs of pockets parallel to its faces between its plies and spaced along said length, each end member being received in a pocket, and the end members on one spoke entering pockets adjacent the ends of said length of material whereby the spoke straddles the joint between adjacent ends of the friction material, making it in effect endless.

12. In a friction clutch, a transmitting member comprising a one piece friction ring so constructed that at a point in the ring the two ends of the material forming the ring lie abutting, spokes having bifurcated ends supporting said ring, the end of one of said spokes straddling the two joined ends of friction material and holding the ring together.

ELMER V. J. TOWER.